No. 887,537. PATENTED MAY 12, 1908.
A. SODERLING.
FRICTION CLUTCH.
APPLICATION FILED APR. 27, 1907.

2 SHEETS—SHEET 1.

Witnesses:
Inventor:
Alfred Soderling
By his Attorney

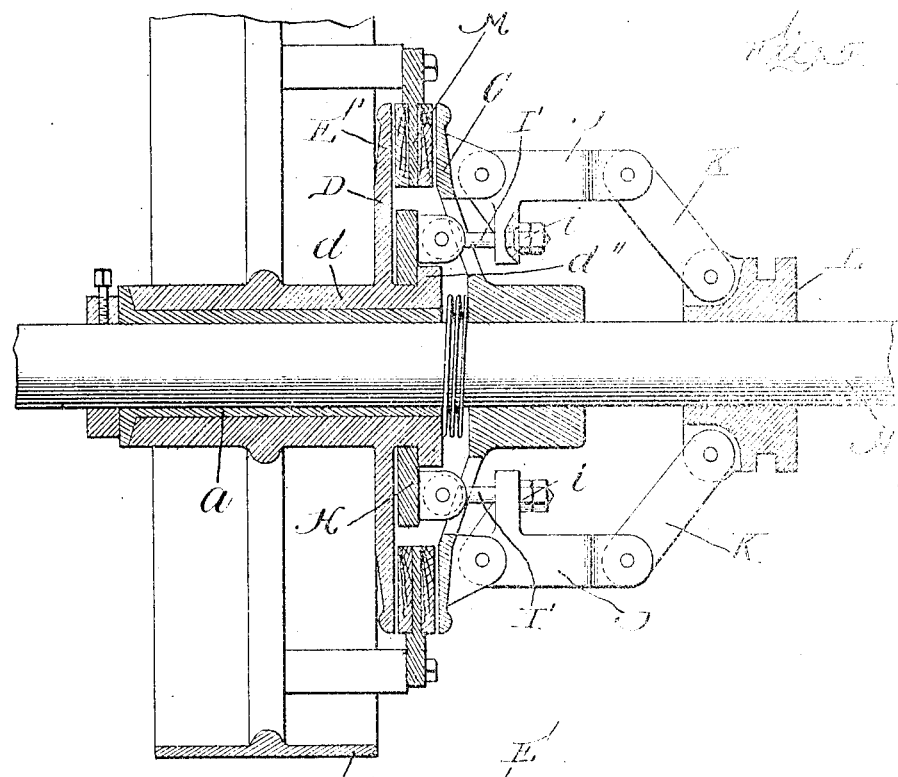

UNITED STATES PATENT OFFICE.

ALFRED SODERLING, OF CHICAGO, ILLINOIS.

FRICTION-CLUTCH.

No. 887,537. Specification of Letters Patent. Patented May 12, 1908.

Application filed April 27, 1907. Serial No. 370,723.

*To all whom it may concern:*

Be it known that I, ALFRED SODERLING, a citizen of the United States, residing at Chicago, in the county of Cook and State of Illinois, have invented certain new and useful Improvements in Friction-Clutches, of which the following is a specification.

The invention relates to a clutch for use in coupling and uncoupling two independently revoluble members, such for example, as two shafts, or a shaft and a pulley.

The object of the invention is to provide a clutch of improved construction, and to this end the invention consists in the features of novelty that are hereinafter described, reference being had to the accompanying drawings which are made a part of this specification, and in which,—

Figure 1:
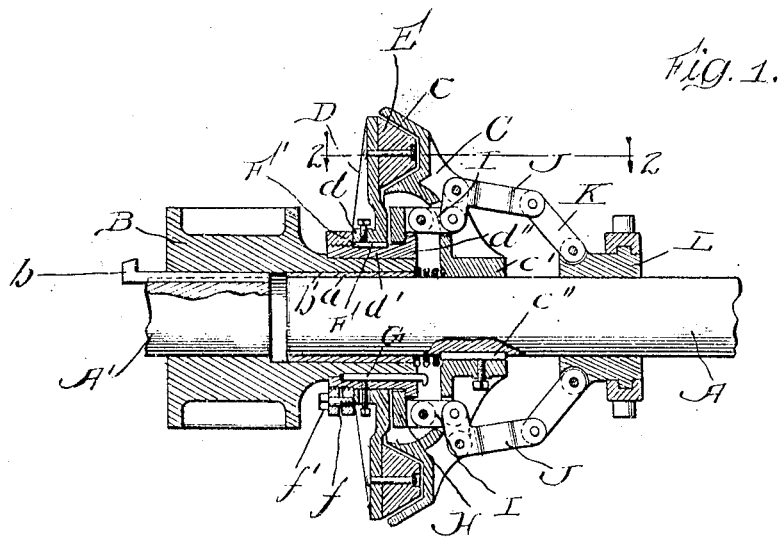
Figure 2:
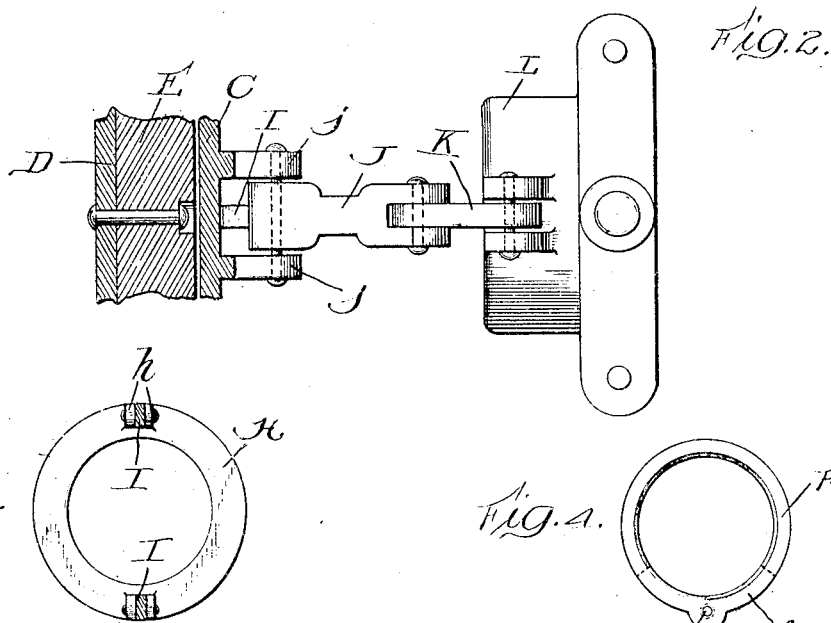
Figure 3:
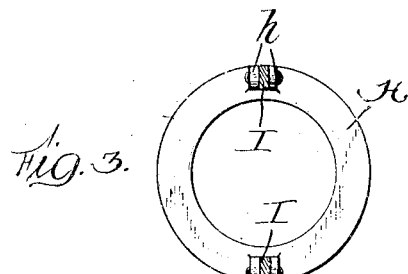
Figure 4:
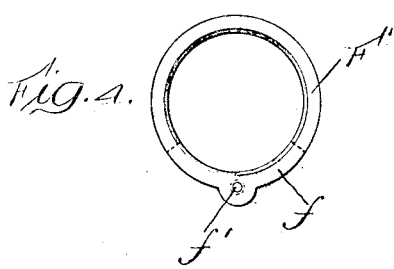

Figure 1 is a central section of a clutch embodying the invention in its preferred form. Fig. 2 is a sectional elevation of some of the parts thereof on a larger scale, the plane of the section being indicated by the line 2—2, Fig. 1. Fig. 3 is a face view of a ring forming a part of the means for connecting the two clutch members or jaws. Fig. 4 is a face view of a stop-ring. Fig. 5 is a central section of a clutch embodying the invention under a modification. Fig. 6 is a sectional elevation of a clutch embodying the invention under still another modification. Fig. 7 is a face view of a ring such as shown in Fig. 3 under a modification.

Referring first, to the preferred form of the invention, A, and A', represent two shafts capable of revolving independently of each other, excepting when coupled together through the medium of the clutch. To the shaft, A', a collar, B, is non-rotatively secured by means of a key, $b$, or other suitable device and this collar has a tubular extension or sleeve, $b'$, into which the end of the shaft, A, projects, a bushing, $a$, being interposed between them, so that they may rotate independently of each other. The clutch has two jaws, C, and D, having friction surfaces which are adapted to directly engage each other, the friction surface of the jaw C, being directly on the jaw itself and being in the form of an annular groove, $c$, of truncated V-shape, while the friction surface of the jaw, D, is formed on a block, E, of wood or other suitable material secured to the jaw and having a friction surface complementary to the friction surface of the jaw, C.

The jaw, C, has a hub consisting of a flange, $c'$, which is secured to the shaft, A, so as to be incapable of either sliding or rotating thereon, by means of a key, $c''$, occupying grooves in their meeting faces, and a set screw engaging the key. The jaw, D, has a hub consisting of a flange, $d$, integral with the main body of the jaw and a bushing $d'$ mounted upon the sleeve $b'$. The flange, $d$, is mounted upon the bushing so as to be capable of limited longitudinal movement thereon, for the purpose of adjustment as hereinafter described, but is held against rotating thereon by a key, F, or some other suitable device. The bushing is non-rotatively secured to the sleeve, $b'$, by means of a key, G, or some other suitable device so that the jaw, D, with its composite hub, the sleeve $b'$, the collar, B, and the shaft, A', move together as a single part. The outer end of the bushing, $d'$, is threaded and on to it is screwed a stop-ring, F', which engages the rear end of the flange, $d$, and holds it in place, the ring being split on one side, circumferentially as shown at, $f$, and the two parts on opposite sides of the split being perforated for the reception of a screw, $f'$, which has threaded engagement with one of said parts, whereby they may be drawn together and thereby cramp the ring and lock it in place on the bushing.

With the mechanism hereinafter described for opening and closing the jaws the movement is very slight and hence it becomes necessary, from time to time, to adjust the parts in order to compensate for the wearing away of the friction surfaces. This is done by turning the stop-ring further on to the bushing and the result of this is to advance the friction surface of the jaw, D, toward the friction surface of the jaw, C. On its inner end the bushing, $d'$, is provided with a radial flange, $d''$, the rear face of which provides a shoulder which is engaged by a continuous ring, H. The ring being put in place upon the bushing before the bushing is inserted through the eye of the flange $d$. This ring carries equi-distant pairs of perforated lugs, $h$, and to these lugs are jointed links, I, said links being also jointed to the ends of the short arms of bell-crank levers, J, which levers are in turn fulcrumed to perforated ears, $j$, on the jaw, C. The ends of the long arms of the bell-crank levers are connected by links, K, with a collar, L, loosely mounted upon the shaft, A, to which the clutch lever not shown in the drawing, is connected by any suitable means. With a clutch thus constructed it will be observed that the shaft, A, may revolve freely, carrying with it the jaw, C, and all parts accessory thereto, including the ring, H, independently of the shaft A', and the jaw, D, when the two jaws of the clutch are out of engagement. When the jaws are to be closed the collar, L, is shifted toward the jaw, C, with the result that the long arms of the bell-crank levers will be forced outward, and the links, I, together with the ring, H, will be drawn toward the jaw, C. The engagement of the ring, H, with the annular shoulder on the hub of the jaw, D, will cause a relative movement of the two jaws toward each other with a consequent engaging of their friction surfaces. The use of the ring, H, is advantageous in allowing the two jaws to revolve independently of each other, and this permits more or less sliding of the friction surfaces one upon the other in the process of closing the jaws with a consequent gradual starting of the theretofore stationary member.

In the form of the invention shown in Fig. 5 the entire hub of the jaw, D, is integral with the body thereof and consists of a flange, $d$, which is loosely mounted upon the shaft, A, through the medium of a bushing, $a$. The flange $d''$, providing the shoulder for the ring, H, is also integral with the jaw, and this makes it necessary to form the ring in two parts as shown in Fig. 7, in order to assemble the parts. In this form of the invention the shoulder, $d''$, is not adjustable relatively to the friction surface, E', of the jaw, D, so that in order to compensate for wear the connections between the jaws, C, and D, are made adjustable. This may be done by passing the link, I', through an opening in the short arm of the bell-crank lever, J, and threading it for receiving an adjusting nut, $i$. In this form of the invention the friction surfaces of the jaws, C and D, do not directly engage each other, but engage the opposite faces of a friction ring, M, carried by a pulley, B', which is loosely mounted upon the shaft, A, through the medium of the bushing, $a$.

In both forms of the invention it will be seen that one jaw of the clutch is provided on its inner side, or, in other words, the side adjacent to the other jaw, with an annular shoulder, a ring is arranged so as to be movable longitudinally into and out of engagement with said shoulder and suitable mechanism is carried by the other jaw and connected with said ring so that by properly operating said mechanism the jaws may be opened and closed. This is the principal novel characteristic of the improved clutch and to it a number of advantages are due. Disregarding the matters of adjustment and assembling of the parts, the integral hub construction has no advantages over the composite hub, but the means of adjustment embodied in the composite hub are superior to an adjustment incorporated in the connections between the ring and the jaw carrying it. Furthermore, the direct engagement of the friction surfaces of the two jaws of the clutch are preferable to their engagement with the third friction device carried by the pulley or other part to which power is to be transmitted. In this connection it may be observed that while in Fig. 1 the jaw, D, of the clutch is shown as carrying a collar non-rotatively secured to a second shaft, it might with equal facility carry a pulley. Or, in other words, the sleeve, $b'$ of Fig. 1 may be regarded as integral with a pulley loosely mounted upon the shaft, A.

The form of the invention shown in Fig. 6 differs from that shown in Fig. 1 only in that the jaw, D, has on its inner side an additional annular shoulder $d^2$ which overlaps and engages the outer margin of the ring H. In this event it is necessary to form the jaw, D, in two longitudinal parts secured together by flanges and bolts as shown at D' in Fig. 6. In fact, all of the parts of clutches of large size are preferably formed in halves secured together, and the jaw, C, and ring H, are so shown in Figs. 6 and 7.

What I claim as new and desire to secure by Letters Patent, is,—

1. In a friction clutch, the combination of a pair of jaws relatively movable toward and from each other, and carrying friction surfaces, one of said jaws having on its inner side an annular shoulder, a loose ring adapted to engage said shoulder, and means supported by the other jaw and engaging said ring for moving it into and out of engagement with said annular shoulder, whereby the jaws are opened and closed.

2. In a friction clutch, the combination of a pair of jaws relatively movable toward and from each other, one of said jaws having a hub provided on its inner portion with an annular shoulder, a loose ring adapted to engage said shoulder, and means supported by the other jaw and engaging said ring for moving it into and out of engagement with said annular shoulder, whereby the jaws are opened and closed.

3. In a friction clutch, the combination of a pair of jaws relatively movable toward and from each other and carrying friction surfaces, one of said jaws having on its inner side an annular shoulder, said shoulder being adjustable relatively to the friction surface of the jaw carrying it, a loose ring adapted to engage said shoulder, and means supported by the other jaw and engaging said ring for moving it into and out of engagement with said annular shoulder, whereby the jaws are opened and closed.

4. In a friction clutch, the combination of a pair of jaws relatively movable toward and from each other, and carrying friction surfaces, one of said jaws having a hub provided with a removable bushing having on its inner end an annular shoulder, means for holding said bushing in place, a loose ring adapted to engage said shoulder, and means supported by the other jaw and engaging said ring for moving it into and out of engagement with said shoulder, whereby the jaws are opened and closed.

5. In a friction clutch, the combination of a pair of jaws relatively movable toward and from each other and carrying friction surfaces, one of said jaws having a hub comprising a flange and a bushing, the flange being longitudinally adjustable on the bushing and the bushing being provided at its inner end with an annular shoulder, a loose ring adapted to engage said shoulder, and means supported by the other jaw and engaging said ring for moving it into and out of engagement with said shoulder, whereby the jaws are opened and closed.

6. In a friction clutch, the combination of a pair of jaws relatively movable toward and from each other, and carrying friction surfaces, one of said jaws having a hub comprising a flange and a bushing, upon which said flange is movable longitudinally, means for preventing the relative rotation of the flange and bushing, the bushing being provided at its inner end with an annular shoulder, a loose ring adapted to engage said shoulder, and means supported by the other jaw and engaging said ring for moving it into and out of engagement with said shoulder, whereby the jaws are opened and closed.

7. In a friction clutch, the combination of a pair of jaws relatively movable toward and from each other, and carrying friction surfaces, one of said jaws having a hub comprising a flange and a bushing, upon which the flange is mounted, the outer end of the bushing being threaded and the inner end provided with an annular shoulder a stop-ring screwed on to the threaded end of the bushing and engaging the flange aforesaid, means for preventing the relative rotation of the flange aforesaid and the bushing, a loose ring engaging the annular shoulder at the inner end of the bushing and means supported by the other jaw and engaging said ring for moving it into and out of engagement with said annular shoulder, whereby the jaws are opened and closed.

ALFRED SODERLING.

Witnesses:
L. M. HOPKINS,
L. S. MATUSZEWICZ.